(12) United States Patent
Sahara et al.

(10) Patent No.: US 6,393,938 B1
(45) Date of Patent: May 28, 2002

(54) CAM FOLLOWER

(75) Inventors: Shinsuke Sahara, Takatsuki; Tatsuo Maeno; Futoshi Kosugi, both of Shizuoka, all of (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/401,461

(22) Filed: Sep. 22, 1999

(30) Foreign Application Priority Data

Sep. 24, 1998 (JP) ............................................ 10-269915

(51) Int. Cl.$^7$ .............................................. F16H 53/06
(52) U.S. Cl. ........................... 74/569; 74/567; 384/255; 123/90.5
(58) Field of Search .................... 74/567–569; 384/255, 384/127, 475; 123/90.5

(56) References Cited

U.S. PATENT DOCUMENTS

| | | | | |
|---|---|---|---|---|
| 3,596,533 A | * | 8/1971 | Nightingale | ................. 74/569 |
| 4,106,826 A | * | 8/1978 | Marola et al. | ............ 74/569 X |
| 4,113,327 A | * | 9/1978 | Koch | ....................... 74/569 X |
| 4,448,550 A | * | 5/1984 | Moroney | .................... 384/127 |
| 4,938,610 A | * | 7/1990 | Kato | ........................... 384/126 |
| 5,531,137 A | * | 7/1996 | Guilford | ...................... 74/569 |
| 5,931,133 A | * | 8/1999 | Giannone et al. | .......... 123/90.5 |
| 6,015,237 A | * | 1/2000 | Ogawa | ....................... 384/475 |
| 6,095,013 A | * | 8/2000 | Hashimoto et al. | ........... 74/569 |

OTHER PUBLICATIONS

"Dynamic Load Ratings and Rating Life for Roling Bearings", Japanese Industrial Standard, JIS B 1518—1992, translated and published by Japanese Standards Association, Tokyo, 107, JP; 1993.

* cited by examiner

Primary Examiner—Vinh T. Luong
(74) Attorney, Agent, or Firm—Dann, Dorfman, Herrell and Skillman; Henry H. Skillman (57) ABSTRACT

Cam follower includes a cantilevered stud, and a bearing unit mounted on a head portion of the stud and having rollers and an outer ring. The outer peripheral surface of the outer ring constitutes a cam-driven surface. The cam-driven surface includes a central load-bearing region substantially parallel to the axis of the cantilevered stud, and a couple of load-reducing bearing regions indented radially inward from the central load-bearing region and located on opposite sides of the central load-bearing region axially symmetrically to each other. Mechanical stress acting on the inner surface of the outer ring, outer surface of the roller and outer surface of the stud's head portion presents a maximum intensity level at their respective points corresponding to a point of the outer ring which is subjected to maximum mechanical contact stress from a cam. However, by the provision of the load-reducing bearing regions, the stress on the inner surface of the outer ring, outer surface of the roller and outer surface of the stud's head portion can be made smaller than that applied from the cam to the cam-driven surface, and the stress acting on the roller can be effectively leveled off.

7 Claims, 4 Drawing Sheets

CAM FOLLOWER

BACKGROUND OF THE INVENTION

1. Field of the Invention

The present invention relates generally to a cam follower which includes a bearing unit mounted on a head portion of a cantilevered stud and each having rollers and an outer ring so that the outer peripheral surface of the outer ring constitutes a follower surface driven by a cam or cam-like guide rail (hereinafter "cam-driven surface"). More particularly, the present invention relates to an improved cam follower suitable for use in indexing drive devices and the like.

2. Description of the Related Art

Figure 5:
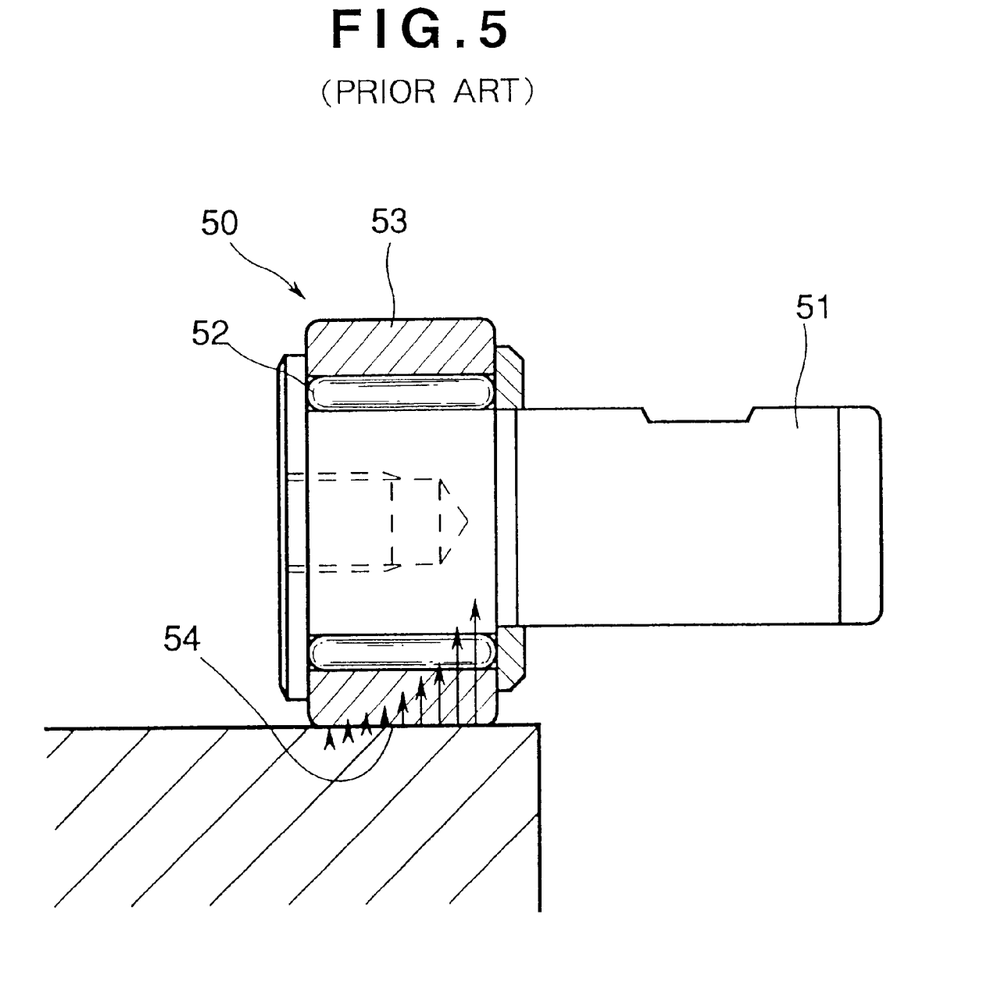
FIG. 5 is a fragmentary front view, partly in cross section, of a conventionally known cam follower.

Among various known types of cam followers is one which, as illustrated in FIG. 5, includes a bearing unit mounted on a head portion of a cantilevered stud 51. The bearing unit includes rollers 52 and an outer ring 53 provided around the outer periphery of a distal end portion of the stud 51. In indexing drive devices, a plurality of such cam followers 50 are disposed at equal intervals or pitches around a driven shaft. Driving shaft is disposed orthogonally to the driven shaft, and the driving shaft has a helical cam formed on its outer periphery. The surface of the helical cam (hereinafter "cam surface") is capable of being sequentially brought into contact with one cam-driven surface to another. Specifically, as the driving shaft makes one rotation, the cam followers are caused to turn with the driven shaft by an angle equal to one pitch between the cam followers. In this way, the driven shaft is driven to turn by a given angle corresponding to the number of rotations of the driving shaft.

With the conventionally-known cam follower, the cam surface and cam-driven surface must of course be processed with high precision in order to attain predetermined linear contact with each other. However, if an inclination occurs in the cantilevered stud of the cam follower, the cam-driven would be brought in so-called "uneven or biased contact" with the cam surface, even in the case where the cam and cam-driven surfaces are processed with sufficient precision. In the case of an indexing drive device or the like, the main cause for such biased contact is that the cam followers project radially outward from the outer periphery of the driven shaft with the respective studs supported in a cantilever fashion and including the bearing units mounted on their head portions and thus the studs are apt to resiliently bend or incline due to the pressing force applied from the cam. Under such conditions, mechanical stress acting on the cam-driven surface and the rolling-contacting surfaces of the rollers and stud's head portion in each of the cam followers would assume a distribution pattern such that it becomes greater in regions closer to the proximal end of the cantilevered stud.

The stud may be secured to the periphery of the driven shaft in a previously inclined posture at an initial stage of assemblage of the cam follower, taking into account the possible resilient bending or inclination; in this case too, however, if the stud is secured to the periphery of the driven shaft in more than or less than a predetermined initial inclination due to manufacturing and assembling errors, then the mechanical stress acting on the cam-driven surface and the rolling-contacting surfaces of the rollers and stud's head portion would assume a distribution pattern such that it becomes greater in regions closer to the free (i.e., distal) or proximal end of the stud.

According to a "rated cam follower lifetime" based on the Japanese Industrial Standards (JIS B 1518-1992), it is required that the mechanical stress acting on the rolling-contacting surfaces of the rollers and stud's head portion be distributed uniformly. In cases where greatest mechanical stress occurs in a local region proximate to the free or proximal end of the cantilevered stud and decreases abruptly in a direction toward the other end, the actual lifetime of the cam follower would be shortened to a significant degree.

SUMMARY OF THE INVENTION

It is accordingly an object of the present invention to provided a cam follower which includes a cantilevered stud and a bearing unit having rollers and an outer ring mounted on a head portion of the cantilevered stud so that the outer peripheral surface of the outer ring constitutes a cam-driven surface, and which can effectively alleviate a maximum intensity level of mechanical stress adversely affecting the lifetime of the bearing unit.

It is another object of the present invention to provide a cam follower which includes a cantilevered stud and a bearing unit having rollers and an outer ring mounted on a head portion of the cantilevered stud so that the outer peripheral surface of the outer ring constitutes a cam-driven surface, and which can effectively level off mechanical stress adversely affecting the lifetime of the bearing unit.

According to a first aspect the present invention, there is provided a cam follower of the type comprising a cantilevered stud and a bearing unit mounted on a head portion of the stud and including rollers and an outer ring, an outer peripheral surface of the outer ring constituting a cam-driven surface. The cam-driven surface includes a central load bearing region substantially parallel to an axis of the cantilevered stud and a couple of load-reducing regions indented radially inward from the central load-bearing region and located on axial opposite sides of the central load-bearing region axially symmetrically to each other.

Because the cam-driven surface includes two radially-indented load-reducing regions formed axially symmetrically about the central load-bearing region, its effective length of contact with a cam surface is shortened as compared to the cam-driven surface of the conventional cam followers, and the pressing force from the cam or cam-like guide rail acts only on the central load-bearing region located at a given distance from the axial opposite ends of the cam-driven surface, instead of acting intensively on the axial opposite ends of the cam-driven surface. Further, in the present invention, the mechanical contact stress applied to the cam driven surface is not transmitted, as is, to between the inner surface of the outer ring and the outer surface of the roller and between the outer surface of the roller and the outer surface of the stud's head portion; instead, the mechanical stress transmitted to between the inner surface of the outer ring and the outer surface of the roller and between the outer surface of the roller and the outer surface of the stud's head portion are caused to present a maximum intensity level at points corresponding to the proximal end of one of the load-reducing regions and then gradually decreases in the directions toward the axial opposite ends of the roller. The load-reducing bearing regions may be formed by partly cutting away axial opposite end portions of the outer ring.

When the cantilevered stud is resiliently bent or inclined by the pressing force from the cam or when the cantilevered stud is inclined in any direction due to an assembling or manufacturing error, the mechanical stress acting on the cam-driven surface becomes greatest at a boundary between the central load-bearing region and one of the load-reducing regions and gradually decreases over the load-bearing region in a direction toward one of the axial opposite ends of the outer ring.

In the cam follower, distribution of the mechanical stress acting on the roller differs from distribution of the mechanical stress acting on the cam-driven surface. The inner peripheral surface of the outer ring and the outer peripheral surface of the stud's head portion extend parallel to the axis of the stud, and each of the rollers has a central cylindrical portion parallel to the axis of the stud and a couple of crown portions extending axially from the axial opposite ends of the cylindrical portion while gradually decreasing in diameter in the directions toward the axial opposite ends of the roller. Although the outer ring and rollers are normally made of steel and have considerable rigidity, they can be resiliently deformed to a certain degree. Thus, the mechanical stress acting on the cam-driven surface is transmitted to between the inner or roller-rolling surface of the outer ring and the outer surface of the roller, from which it gradually decreases over a central range corresponding to the axial length of the central cylindrical portion of the roller and then over end ranges corresponding to the axial length of the crown portions of the roller. The mechanical stress acting on the cam-driven surface is also transmitted to between the outer or roller-rolling surface of the stud's head portion and the outer surface of the roller and acts in generally the same manner as the above-mentioned mechanical stress transmitted to between the inner or roller-rolling surface of the outer ring and the outer surface of the roller.

By thus providing the radially-indented load-reducing bearing regions on opposite sides of the central load-bearing region of the cam-driven surface, the maximum mechanical contact stress applied to the cantilevered stud is initially transmitted only to the central portion of the roller and then gradually decreases in the directions toward the axial opposite ends of the roller, so that the mechanical stress acting between the inner surface of the outer ring and the outer surface of the roller and the mechanical stress acting between the outer surface of the roller and the outer surface of the stud's head portion can be effectively leveled off. Because the maximum mechanical stress acting between the inner surface of the outer ring and the outer surface of the roller and the maximum mechanical stress acting between the outer surface of the roller and the outer surface of the stud's head portion are transmitted only to the central portion of the roller, the maximum intensity level of the mechanical stress on the outer ring, roller and stud can be significantly alleviated as compared to the conventional cam followers where the maximum mechanical stress occurs at the axial opposite ends of the roller.

Generally speaking, the greatest factor that governs the lifetime of the bearing unit is scaling-off of the wall surface due to fatigue of the metal material. In such a situation where the stud is cantilevered and thus the mechanical stress tends to concentrate at one end of the outer ring, the actual lifetime of the bearing unit can be prolonged by the present invention where the two load-reducing regions are formed on both sides of the central load-bearing region so as to level off the mechanical stress acting on the roller and alleviate the maximum level of the mechanical stress.

In each of the conventional bearing units, the outer ring normally has corner edges rounded or chamfered as typically defined by JIS (Japanese Industrial Standards) representation "R" or "C". In the inventive cam followers, the load-reducing regions of the outer ring has greater chamfers than those conventional chamfers.

The inventive cam follower is also characterized in that the load-reducing regions are formed on both sides of the central load-bearing region axially symmetrically to each other about the load-bearing region. This symmetric arrangement can level off the mechanical stress on the bearing unit and also effectively alleviate the maximum intensity level of the stress, irrespective of a direction in which the cantilevered stud is resiliently bent or inclined relative to the cam or cam-like guide rail.

Further, the symmetrical provision of the load-reducing bearing regions can eliminate a need to accurately place the outer ring in a predetermined one of two axial orientations at the time of assemblage of the cam follower; that is, the outer ring can be mounted in either of the two axial orientations. Namely, if the stud is always resiliently bent or inclined only in one known direction, then the cam follower may have the load-reducing region only on one side of the central load-bearing region, in which case, however, there would arise a need to first accurately orient the outer ring so that the load-reducing bearing region lies adjacent to the free or proximal end of the cantilevered stud before the outer ring is mounted on the stud. As a result, the symmetrical provision of the load-reducing bearing regions can reliably avoid erroneous mounting of the outer ring and also simplify the necessary assembling operations.

According to a second aspect of the present invention, the cam-driven surface includes a central load-bearing region substantially parallel to an axis of the stud, and a couple of load-reducing regions located on axial opposite sides of the central load-bearing region axially symmetrically about the central load-bearing region and having respective outer diameters decreasing in the directions toward the axial opposite ends of the outer ring.

Because the load-reducing regions are provided on axial opposite sides of the central load-bearing region axially symmetrically to each other about the central load-bearing region and have their respective outer diameters decreasing in the directions toward the axial opposite ends of the outer ring, the mechanical contact stress applied from the cam or cam-like guide rail to the outer ring presents a maximum intensity level at the proximal or free end of one of the load-reducing regions and is gradually reduced over the one load-reducing region. The load-bearing region has a cylindrical surface. The load-reducing regions are preferably made by shaping the outer ring's axial opposite end portions in such a manner that the end portions each assume a section with a secondary degree curve, an n-degree curve, an exponential function line, a trigonometric function line, or the like. In any case, the non-load-bearing regions have a reduced mean diameter smaller than the outside diameter of the load-bearing regions. The specific shape of the load-reducing regions is determined taking into account possible manufacturing errors of the cam or cam-like guide rail and various components of the cam follower, mechanical strength of the stud, etc.

When the cantilevered stud is resiliently bent or inclined due to the pressing force from the cam or when the cantilevered stud is inclined in any direction due to an assembling or manufacturing error, the mechanical stress acting on the cam-driven surface in the inventive cam follower becomes greatest at a boundary between the central load-bearing region and one of the load-reducing regions and gradually decreases in the directions toward the axial opposite ends of the outer ring, if the load-reducing regions are each shaped to have a conical surface.

If the load-reducing regions are each formed to have a curved surface and when the cantilevered stud is resiliently bent or inclined, the point of the maximum mechanical stress acting on the outer ring is displaced toward one of the axial opposite ends of the outer ring by the resilient bending or inclination; in this case, the maximum mechanical stress acts on a point close to the boundary between the central load-bearing region and one of the load-reducing regions and gradually decreases in the directions toward the axial opposite ends of the outer ring. It is most preferable that the load-reducing regions be formed, taking into consideration of possible bending or inclination of the stud, in such a way that the mechanical stress on the outer ring can be leveled off appropriately; however, it is normally very difficult to predict manufacturing and assembling errors of various components parts of the cam follower. Therefore, it is desirable that the load-reducing regions be formed to have a curved surface to allow the maximum mechanical stress to occur at a point near the boundary.

In the cam follower according to the second aspect of the invention too, distribution of the mechanical stress acting on the roller differs from distribution of the mechanical stress acting on the cam-driven surface. As in the above-discussed first-aspect cam follower, the mechanical stress acting between the inner or roller-rolling surface of the outer ring and the outer surface of the roller and the mechanical stress acting between the outer surface of the roller and the outer or roller-rolling surface of the stud's head portion are caused, via the load-reducing regions, to gradually decrease or level off.

Further, because the maximum mechanical stress acting between the inner surface of the outer ring and the outer surface of the roller and the maximum mechanical stress acting between the outer surface of the roller and the outer surface of the stud's head portion are transmitted only to the axial central portion of the roller, the maximum intensity level of the mechanical stress on the outer ring, roller and stud can be significantly alleviated as compared to the conventional cam followers where the maximum mechanical stress occurs at the axial opposite ends of the roller.

The actual lifetime of the bearing unit can be prolonged by the present invention where the load-reducing regions are provided at the axial end portions of the cam-driven surface to level off the mechanical stress acting on the roller and alleviate the maximum intensity level of the mechanical stress.

In the second-aspect cam follower too, each of the load-reducing regions of the outer ring has greater chamfers than those in the conventional cam followers.

Furthermore, because the load-reducing regions are formed on both sides of the central load-bearing region axially symmetrically to each other about the load-bearing region, it is possible to level off the mechanical stress on the bearing unit and effectively alleviate the maximum intensity level of the stress, irrespective of a direction in which the cantilevered stud is resiliently bent or inclined relative to the cam or cam-like guide rail. Further, the symmetrical provision of the load-reducing regions can reliably avoid erroneous mounting of the outer ring without having to accurately place the outer ring in the predetermined axial orientation, and also simplify the necessary assembling operations.

The above and other objects, features and advantages of the present invention will become manifest to those versed in the art upon making reference to the following detailed description and the accompanying sheets of drawings in which certain preferred structural embodiments incorporating the principle of the present invention are shown by way of illustrative examples.

DETAILED DESCRIPTION OF THE PREFERRED EMBODIMENTS

Figure 1:
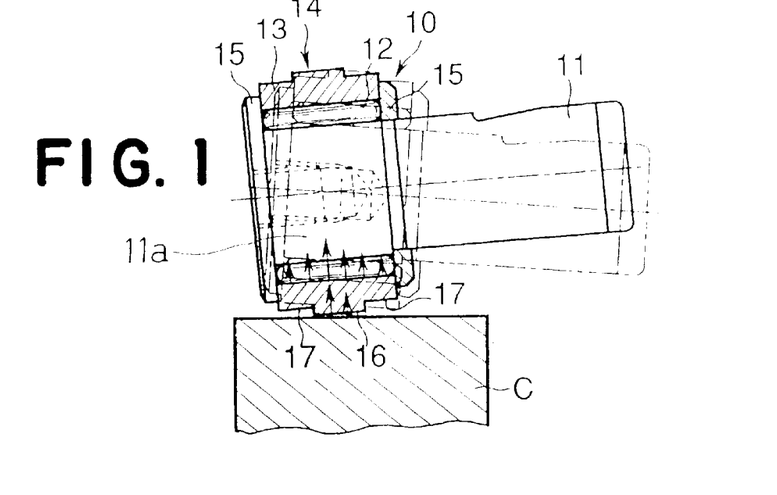
FIG. 1 is a front view, partly in cross section, of a cam follower in accordance with a first embodiment of the present invention.
Figure 4:
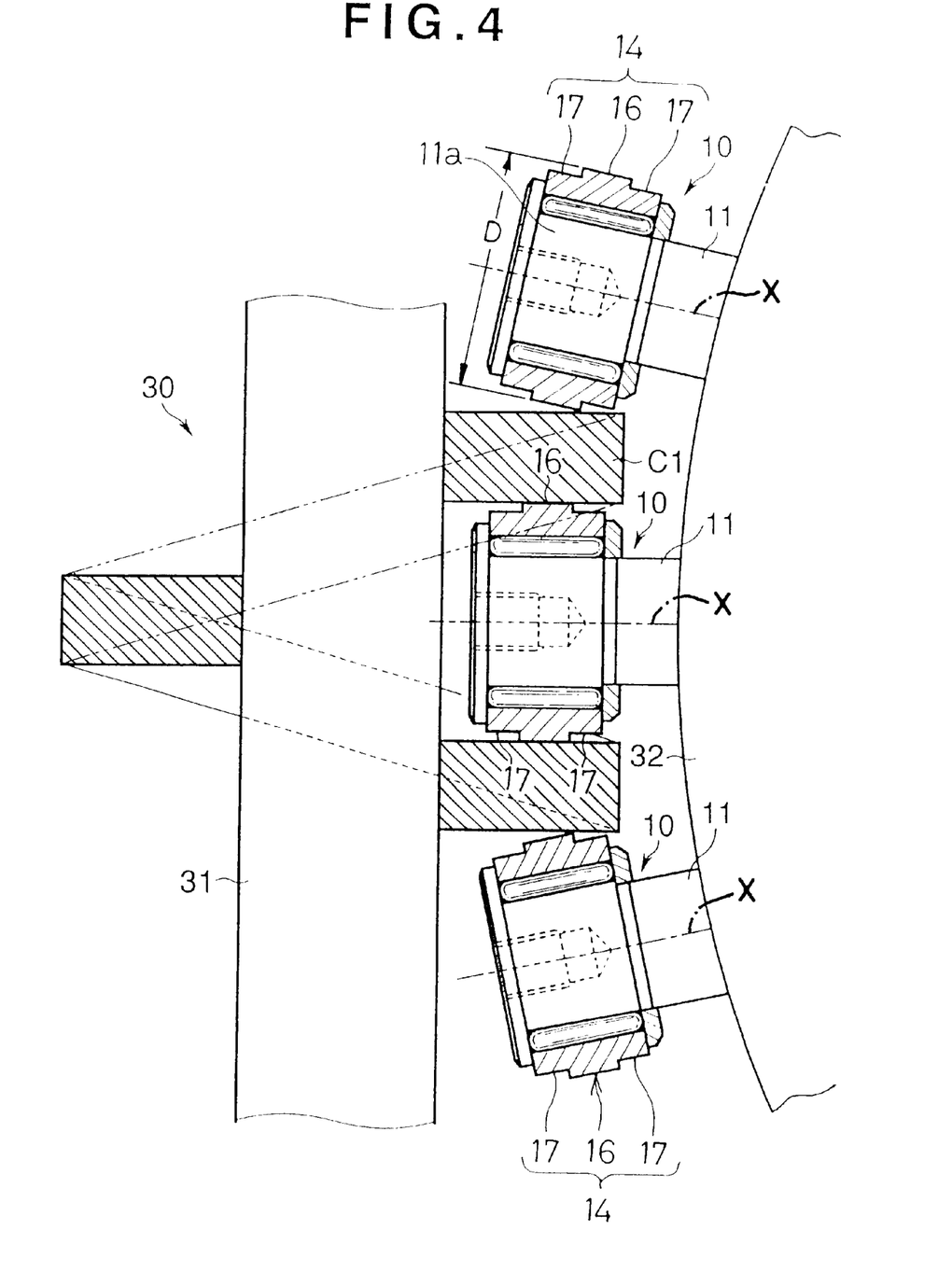
FIG. 4 is a fragmentary front view, partly in section, of an indexing drive device employing the cam followers shown in FIG. 1.

Certain preferred embodiments of the present invention will be described in greater detail with reference to the accompanying sheets of drawings. FIG. 1 is a front view, partly in cross section, of a cam follower in accordance with a first embodiment of the present invention. As shown, the cam follower 10 includes a cantilevered stud 11 and a bearing unit mounted on a head portion 11a of the cantilevered stud 11. The bearing unit has a multiplicity of rollers 12 and an outer ring 13. The rollers 12 are held between the head portion 11a of the stud 11 and the outer ring 13 for rolling engagement with an inner peripheral surface of the outer ring 13 and an outer peripheral surface of the head portion 11a of the stud 11. The outer peripheral surface of the outer ring constitutes a cam-engaging or cam-driven surface 14. The stud 11 of the cam follower 10 is secured at one end to a predetermined driven member 32. The stud 11 is one of a series of studs having axes X radiating from the turning axis (not shown) of the driven shaft 32. In FIG. 4, the extensions of the axes X beyond the righthand side of the drawing will intersect at the axis of the driven shaft which is also at the center of the circular arc illustrating the driven shaft 32. The head portion 11a of the cantilevered stud 11 is slightly greater in diameter than the other portions of the stud 11, and the outer peripheral surface of the stud head portion 11a constitutes a surface along which the rollers 12 roll, i.e., a roller-rolling surface. Each of the rollers 12 and the outer ring 13 are locked between a pair of thrust washers 15, fixed to opposite ends of the stud head portion, against axial movement along the cantilevered stud 11. Whereas the outer ring 13 is illustrated in FIG. 1 as having a cylindrical inner peripheral surface, it may have a flange at least at one end thereof and the inner surface of such a flange may function as a roller-rolling surface as known in the art. In the case where the the outer ring 13 has the flanges at its opposite ends, the thrust washers are not necessary. The rollers 12 are held, via a retainer (not shown), at equal intervals along the outer periphery of the study head portion 11a.

The outer ring 13 has a central load-bearing region 16 formed substantially in parallel to the axis of the stud 11, and a couple of load-reducing regions 17 located axially symmetrically to each-other about the central load-bearing region 16 and indented radially inward from the load-bearing region 16, that is, the central load-bearing region 16 of the outer ring 13 projects away from the axis of the stud 11 and beyond the load-reducing regions 17 located on both sides thereof, and the load-reducing regions 17 extend up to the axial opposite ends of the stud's head portion 11a or outer ring 13. The indented load-reducing regions 17 have a uniform outside diameter throughout the lengths thereof, and have a reduced diameter smaller than the outside diameter of the load-bearing region 16. Therefore, in this embodiment, the effective length of the cam-driven surface 14 engageable with the cam C is limited to the axial length of the central load-bearing region 16, and no pressing force from the cam C acts on axial end portions, i.e., the indented load-reducing regions 17, of the outer ring 13. As illustrated in the drawings, and in particular FIG. 2, the combined axial width (W1 +W1) of the load-reducing regions is at least equal to the width (W2 of the cylindrical surface of the load-bearing region. For example, when the cantilevered stud 11 is inclined downward due to a mounting error as depicted by solid line in FIG. 1, the mechanical contact stress from the cam C becomes greatest at a boundary between the load-bearing region 16 and one of the load-reducing regions 17 closer to the free end of the cantilevered stud 11. Conversely, when the cantilevered stud 11 is inclined upward due to a mounting error as depicted by dot-dash line in FIG. 1, the mechanical contact stress from the cam C becomes greatest at a boundary between the central load-bearing region 16 and the other load-reducing region 17 closer to the proximal end of the cantilevered stud 11.

The lifetime of the bearing unit tends to be adversely affected by the mechanical stress acting between the inner or roller-rolling surface of the outer ring 13 and the outer surface of the rollers 12 and the mechanical stress acting between the outer surface of the rollers 12 and the outer or roller-rolling surface of the stud head portion 11a, not by the mechanical stress acting directly on the cam-driven surface 14. The "lifetime of the bearing unit" means a length of time during which the bearing unit can function properly before substantial scaling-off occurs in the wall surface of any of its component elements due to fatigue of the metal material used. What tends to scale off most easily is the outer peripheral surface of the convexly-shaped stud's head portion 11a. The lifetime of the bearing unit in the cam follower 10 according to this embodiment depends greatly on the possibility of scaling-off in the outer peripheral surface of the convexly-shaped stud's head portion 11a which is one of the roller-rolling surfaces of the bearing unit.

According to the instant embodiment, the mechanical contact stress on the cam-driven surface 14 is not transferred, as is, to between the inner surface of the outer ring 13 and the outer surface of the roller 12 and between the outer surface of the roller 12 and the outer surface of the stud's head portion 11a; instead, the maximum mechanical stress is alleviated through resilient deformation of the cantilevered stud 11, roller 12 and outer ring 13. As seen from arrow indications in FIG. 1, the inner surface of the outer ring 13, outer surface of the roller 12 and outer surface of the stud's head portion 11a are subjected to the maximum stress at their respective points corresponding to a point of the cam-driven surface 14 where the maximum mechanical contact stress is applied; however, the maximum mechanical stress on the inner surface of the outer ring 13, outer surface of the roller 12 and outer surface of the stud's head portion 11a becomes smaller than that acting on the cam-driven surface 14 and gradually decreases in the directions toward the axial opposite ends of the outer ring 13, i.e., toward the free and proximal ends of the cantilevered stud 11. It can be assumed that the mechanical stress acting between the inner surface of the outer ring 13 and the outer surface of the roller 12 and the mechanical stress acting between the outer surface of the roller 12 and the outer surface of the stud's head portion 11a assume generally the same intensity distribution.

By the provision of the load-reducing regions 17 on opposite sides of the central load-bearing region 16 of the cam-driven surface 14, the maximum mechanical stress directly affecting the lifetime of the bearing unit can be effectively alleviated when the cantilevered stud 11 is resiliently bent or inclined in any direction, or when the cam-driven surface 14 is brought into biased contact with the cam C or cam-like guide rail; besides, the point where the maximum mechanical stress acts is displaced to the axial center of the roller 12. Namely, the mechanical stress acting between the inner surface of the outer ring 13 and the outer surf ace of the roller 12 and the mechanical stress acting between the outer surface of the roller 12 and the outer surface of the stud's head portion 11a each becomes greatest at and around the axial center and gradually decrease in the directions toward the axial opposite ends of the outer ring 13, so that the stress acting on the roller 12 can be effectively leveled off. In addition, the reduced maximum intensity level of the mechanical stress can significantly prolong the lifetime of the bearing unit.

Further, by providing the load-reducing regions 17 axially symmetrically to each other about the central load bearing region 16 of the cam-driven surf ace 14, the outer ring 13 need not be accurately placed in a predetermined one of two axial orientations at the time of assemblage of the cam follower 10; that is, it can be mounted in either of the two axial orientations, unlike the ones having a single load-reducing bearing region on only one of the end portions thereof. Thus, it is possible to simplify the manufacture of the cam follower 10 to thereby enhance the productivity. Also, the assemblage of the outer ring 13 can be automated easily.

The load-reducing bearing regions 17 of the inventive cam follower 10 may be formed in various ways; for example, the load-reducing bearing regions 17 may be made by cambering each of the axially opposite end portions of the outer ring 13 in a shape as defined by the JIS representation "R" or in a conical shape. Even with the load-reducing bearing regions 17 shaped like this, the maximum level of the mechanical stress on the cam-driven surface 14 is displaced to the axial centers of the outer ring 13 and roller 12, so that the mechanical stress acting between the inner surface of the outer ring 13 and the outer surface of the roller 12 and the mechanical stress acting between the outer surface of the roller 12 and the outer surface of the stud's head portion 11a each presents leveledoff intensity distribution and the maximum intensity level of the mechanical stress can be alleviated to achieve a prolonged lifetime of the cam follower, just as in the above-described embodiment. Further, by providing the non-load-bearing regions 17 axially symmetrically to each other about the load-bearing region 16 of the cam-driven surface 14, the lifetime of the bearing unit can be effectively prolonged even when the cantilevered stud 11 is resiliently bent or inclined in any direction.

Figure 2:
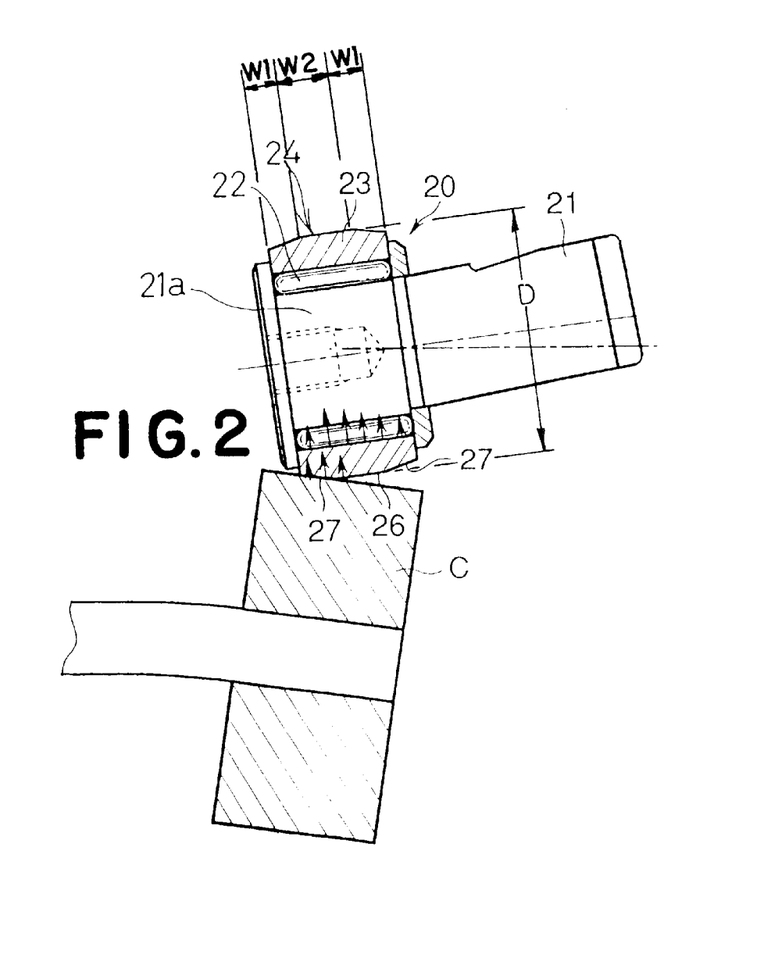
FIG. 2 is a front view, partly in cross section, of a cam follower in accordance with a second embodiment of the present invention.

FIG. 2 is a front view, partly in cross section, of a cam follower 20 in accordance with a second embodiment of the present invention, which is similar in construction to the first embodiment of FIG. 1 except for the shape of the outer ring 23. As shown, the outer ring 23 includes a cylindrical central load-bearing region 26 substantially parallel to the axis of the cantilevered stud 21, and two load-reducing regions 27 formed on opposite sides of the central load-bearing region 26 axially symmetrically to each other about the central load-bearing region 26 and having their respective diameters gradually decreasing in the directions toward the axial opposite ends of the outer ring 23, i.e., the free and proximal ends of the cantilevered stud 21. The mean outside diameter of the two load-reducing regions 27 is smaller than the outside diameter of the load-bearing region 26.

In the cam follower 20 of FIG. 2, the load-reducing regions 27 are each in the shape of a truncated cone, so that when the cantilevered stud 21 is resiliently bent and the outer ring 23 is inclined as the cam follower 20 is pressed by the cam C or cam-like guide rail, the mechanical contact stress acting on the outer ring 23 becomes greatest at a central portion of the outer ring 23, i.e., at the proximal end of one of the load-reducing regions 27, from which it gradually decreases in the directions toward the axial opposite ends of the outer ring 23. Also, the mechanical stress acting between the inner surface of the outer ring 23 and the outer surface of the roller 22 and the mechanical stress acting between the outer surface of the roller 22 and the outer surface of the stud's head portion 21a can be leveled off, and also the maximum intensity level of the mechanical stress can be reduced significantly.

By the provision of the load-reducing regions 27 on opposite sides of the cylindrical central load-bearing region 26 of the cam-driven surface 24, the maximum intensity level of the mechanical stress can be moved to the axial center of the outer ring 23 and the mechanical stress on the roller 22 that directly affects the lifetime of the bearing unit can be effectively leveled off, even when the cam-driven surface 24 is brought into biased contact with the cam C or cam-like guide rail.

Figure 3:
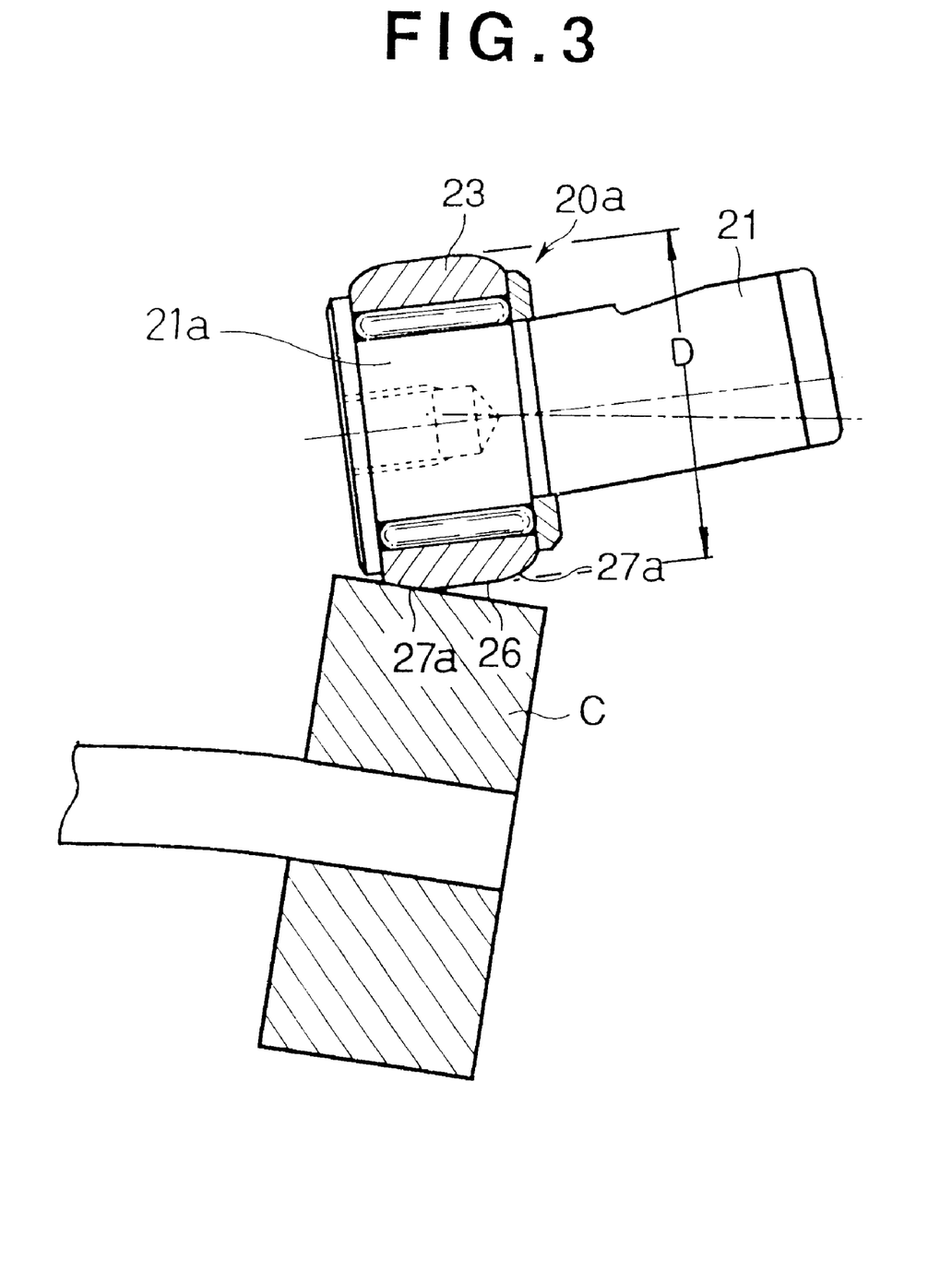
FIG. 3 is a view similar to FIG. 2, showing a modified cam follower according to the present invention.

The load-reducing regions 27, decreasing in outer diameter in the directions toward the axial opposite ends of the outer ring 23, may be made by shaping the ring's axial opposite end portions in such a manner that the end portions each have a longitudinal or axial section with a curve such as denoted by 27a shown in FIG. 3. The curve 27a may be a secondary degree curve, a cubic curve, an exponential function line, a trigonometric function line, or the like. As in the embodiments of FIGS. 1 and 2, the mean diameters of the load-reducing portions 27a are smaller than the outside diameter of the load-bearing portion of the ring 23.

Because the two load-reducing regions 27 of FIG. 2 (also the two load-reducing regions 27a of FIG. 3) are difficult to visually distinguish from each other, it will be very useful to provide them on opposite sides of the load-bearing region 26 axially symmetrically to each other about the region 26. The symmetrical provision of the load-reducing regions 27 can eliminate the need to accurately place the outer ring 23 in a predetermined one of two axial orientations at the time of assemblage of the cam follower; that is, the outer ring 23 can be mounted in either of the two axial orientations. Therefore, it is possible to reliably avoid occurrence of excessive mechanical stress due to erroneous assemblage of the outer ring 23 and also reduce the necessary number of the assembling steps to thereby achieve enhanced production efficiency.

FIG. 4 is a fragmentary front view, partly in section, of an indexing drive device 30 employing the cam followers 10 of the present invention, which includes a driving shaft 31 and a driven shaft 32 that are disposed orthogonal to each other. cam C1 in the form of a helical rail or ridge is formed on the outer surface of the driving shaft 31, and a plurality of the above-described cam followers 10 are disposed at uniform intervals along the outer peripheral surface of the driven shaft 32 and project radially outward from the outer peripheral surface of the driven shaft 32 for sequential engagement with the cam C1. The cam-driven surface 14 of each of the cam followers 10 has a central load-bearing region 16 substantially parallel to the axis of the stud 11, and non-load-bearing regions 17 formed on opposite sides of the load-bearing region 16 in axially symmetrical relation to each other about the region 16, as shown FIG. 1.

The pitch of the helical ridges of the cam C1 and the pitch of the cam followers 10 are substantially equal to each other. One rotation of the driving shaft 31 causes the driven shaft 32 to turn by one pitch, so that the driven shaft 32 is indexed in accordance with the number of rotations of the driving shaft 31.

With the indexing drive device 30, it is difficult to accurately form the surface of the cam C1, mount the driving shaft 31 and position the driven and driven shafts 31 and 32 in such a manner that the cam surface constantly contacts the cam-driven surface of any one of the cam followers 10 in parallel relation thereto. Due to this, the cam-driven surface 14 tends to be brought into biased contact with the cam surface during one rotation of the driving shaft 31. In the latter half of the pitch feed by the cam C1, the driving force from the cam C1 is applied to an area of the cam follower 10 deviated axially from the center thereof, as shown in FIG. 3.

However, even in the indexing drive device 30 which is liable to cause such biased contact, the use of the inventive cam follower 10 can effectively level off the mechanical stress on the roller that affects the lifetime of the bearing unit and thereby reduce the maximum intensity level of the mechanical stress. Thus, the shape of the cam C1 can be simplified, so that the lifetime of the cam C1 be prolonged without having to make the cam C1 with high precision.

Although the indexing drive device 30 of FIG. 4 has been shown and described as employing the cam followers 10 of FIG. 1 having the non-load-bearing regions, it may of course employ the cam followers 20 of FIG. 2 or cam followers 20a of FIG. 3 having the load-reducing regions.

In summary, the present invention is characterized in that the non-load-bearing regions or load-reducing regions are formed on both sides of the central load-bearing region axially symmetrically to each other about the load-bearing region. By the symmetric provision of the non-load-bearing regions or load-reducing regions, the present invention can effectively alleviate a maximum intensity level of the mechanical stress adversely affecting the lifetime of the bearing unit, and also can effectively level off the mechanical stress adversely affecting the lifetime of the bearing unit.

Obviously, various minor changes and modifications are possible in the light of the above teaching. It is therefore to be understood that within the scope of the appended claims, the present invention may be practiced otherwise than as specifically described.

What is claimed is:

1. A cam follower adapted to be driven by a helical cam surface formed on the outer periphery of a driving shaft, said driving shaft mounted for rotation on a driving axis;

said cam follower comprising a driven shaft positioned with its driven axis orthogonal to the driving shaft axis;

a cantilevered stud having an axis radiating from said driven shaft, and a head portion at the end of said stud furthest from said driven shaft axis operable to be indexed circumferentially of said driven axis upon rotation of said driven shaft; and a bearing unit mounted on said head portion of said cantilevered stud and including rollers and an outer ring having an outer peripheral surface constituting a cam-driven surface, said cam-driven surface including a central load-bearing region having a cylindrical outside surface substantially parallel to said radiating axis of said cantilevered stud, and a couple of load-reducing regions located on axial opposite sides of said central load-bearing region axially symmetrically to each other, said load-reducing regions having a combined width along said radiating axis at least equal to the width of the cylindrical outside surface of said central load-bearing region, and a reduced mean diameter smaller than said outside diameter of said load-bearing region.

2. A cam follower according to claim 1, wherein said load-reducing regions of said cam driven surface comprise cylindrical surfaces with a uniform outside diameter equal to said reduced mean diameter.

3. A cam follower according to claim 1 wherein said load-reducing regions have outer diameters decreasing in directions toward axial opposite ends of said outer ring.

4. A cam follower according to claim 3, wherein each of said load-reducing regions of said cam-driven surface has a conical outer surface.

5. A cam follower according to claim 3, wherein the outer surface of each of said load-reducing regions of said cam-driven surface is curved in the axial direction of said outer ring.

6. A cam follower according to claim 1, wherein said load-reducing regions of said cam driven surface have conical outside surfaces.

7. A cam follower according to claim 1, wherein said load-reducing regions of said cam driven surface have outside surfaces curved in the axial direction of the outer ring.

* * * * *

UNITED STATES PATENT AND TRADEMARK OFFICE
CERTIFICATE OF CORRECTION

PATENT NO. : 6,393,938 B1 Page 1 of 1
DATED : May 28, 2002
INVENTOR(S) : Sahara et al.

It is certified that error appears in the above-identified patent and that said Letters Patent is hereby corrected as shown below:

<u>Title page,</u>
The Assignee should read as follows:
-- [73] Assignee: Tsubakimoto Chain Co., Osaka (JP) and
NTN Corporation, Osaka (JP) --

Signed and Sealed this

Twenty-eighth Day of January, 2003

JAMES E. ROGAN
*Director of the United States Patent and Trademark Office*